(12) United States Patent
Griffin

(10) Patent No.: US 9,483,085 B2
(45) Date of Patent: Nov. 1, 2016

(54) PORTABLE ELECTRONIC DEVICE INCLUDING TOUCH-SENSITIVE DISPLAY AND METHOD OF CONTROLLING SAME

(75) Inventor: Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 275 days.

(21) Appl. No.: 13/150,501

(22) Filed: Jun. 1, 2011

(65) Prior Publication Data

US 2012/0306903 A1  Dec. 6, 2012

(51) Int. Cl.
| | |
|---|---|
| *G06F 3/0488* | (2013.01) |
| *G06F 1/16* | (2006.01) |
| *G06F 3/0485* | (2013.01) |
| *G06F 3/0482* | (2013.01) |
| *G06F 3/01* | (2006.01) |

(52) U.S. Cl.
CPC ........... *G06F 1/1694* (2013.01); *G06F 3/0485* (2013.01); *G06F 3/04886* (2013.01); *G06F 3/017* (2013.01); *G06F 3/0482* (2013.01); *G06F 2200/1637* (2013.01); *G06F 2203/04803* (2013.01)

(58) Field of Classification Search
CPC ........ B22F 3/20; B22F 3/003; G06F 3/0488; G06F 3/041; G06F 1/1626; G06F 2200/1637; G06F 3/0485; G06F 3/04883; G06F 3/04886; G06F 3/0237; G06F 1/1694; G06F 3/0346; G06F 3/033; G06F 17/5009; G06F 3/0416
USPC ......................................................... 345/684
See application file for complete search history.

(56) References Cited

U.S. PATENT DOCUMENTS

| | | | |
|---|---|---|---|
| 6,366,302 B1* | 4/2002 | Crosby | H04M 1/274525 715/783 |
| 6,624,824 B1 | 9/2003 | Tognazzini et al. | |
| 6,937,272 B1 | 8/2005 | Dance | |
| 2009/0197635 A1 | 8/2009 | Kim et al. | |
| 2009/0303204 A1 | 12/2009 | Nasiri et al. | |
| 2010/0125816 A1 | 5/2010 | Bezos | |
| 2010/0188432 A1* | 7/2010 | Tsai et al. | 345/684 |
| 2011/0115817 A1* | 5/2011 | Chun | G06F 3/04817 345/629 |
| 2011/0193788 A1* | 8/2011 | King et al. | 345/173 |
| 2011/0193881 A1* | 8/2011 | Rydenhag | 345/647 |
| 2011/0254792 A1* | 10/2011 | Waters | G06F 1/1626 345/173 |
| 2014/0157142 A1* | 6/2014 | Heinrich | H04L 67/1095 715/744 |

OTHER PUBLICATIONS http://lonelysandwich.com/post/48198569/tilt-scrolling-instapaper-pro—published Aug. 31, 2008.
European Patent Application No. 11168378.5, Extended Search Report dated Oct. 4, 2011.
Examiner's Report dated Feb. 5, 2014, issued on corresponding Canadian patent application No. 2,776,133.
Examiner's Report dated Jan. 30, 2015, issued on corresponding Canadian patent application No. 2,776,133.

* cited by examiner

*Primary Examiner* — Jacinta M Crawford
*Assistant Examiner* — Diane Wills
(74) *Attorney, Agent, or Firm* — Borden Ladner Gervais LLP; Geoffrey deKleine

(57) ABSTRACT

A method of controlling a portable electronic device includes displaying a portion of information on a touch-sensitive display; detecting a touch on the touch-sensitive display at a touch location associated with the information; detecting a tilt of the portable electronic device; and in response to detecting the tilt, scrolling the information.

15 Claims, 8 Drawing Sheets

PORTABLE ELECTRONIC DEVICE INCLUDING TOUCH-SENSITIVE DISPLAY AND METHOD OF CONTROLLING SAME

FIELD OF TECHNOLOGY

The present disclosure relates to portable electronic devices including touch-sensitive displays and the control of such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

A touch-sensitive display, also known as a touchscreen display, is particularly useful on handheld devices including PDAs, smart phones and tablets, for example, which are small and have limited space for user input and output. The information displayed on the touch-sensitive displays may be displayed and modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached figures, wherein.

DETAILED DESCRIPTION

Figure 1:
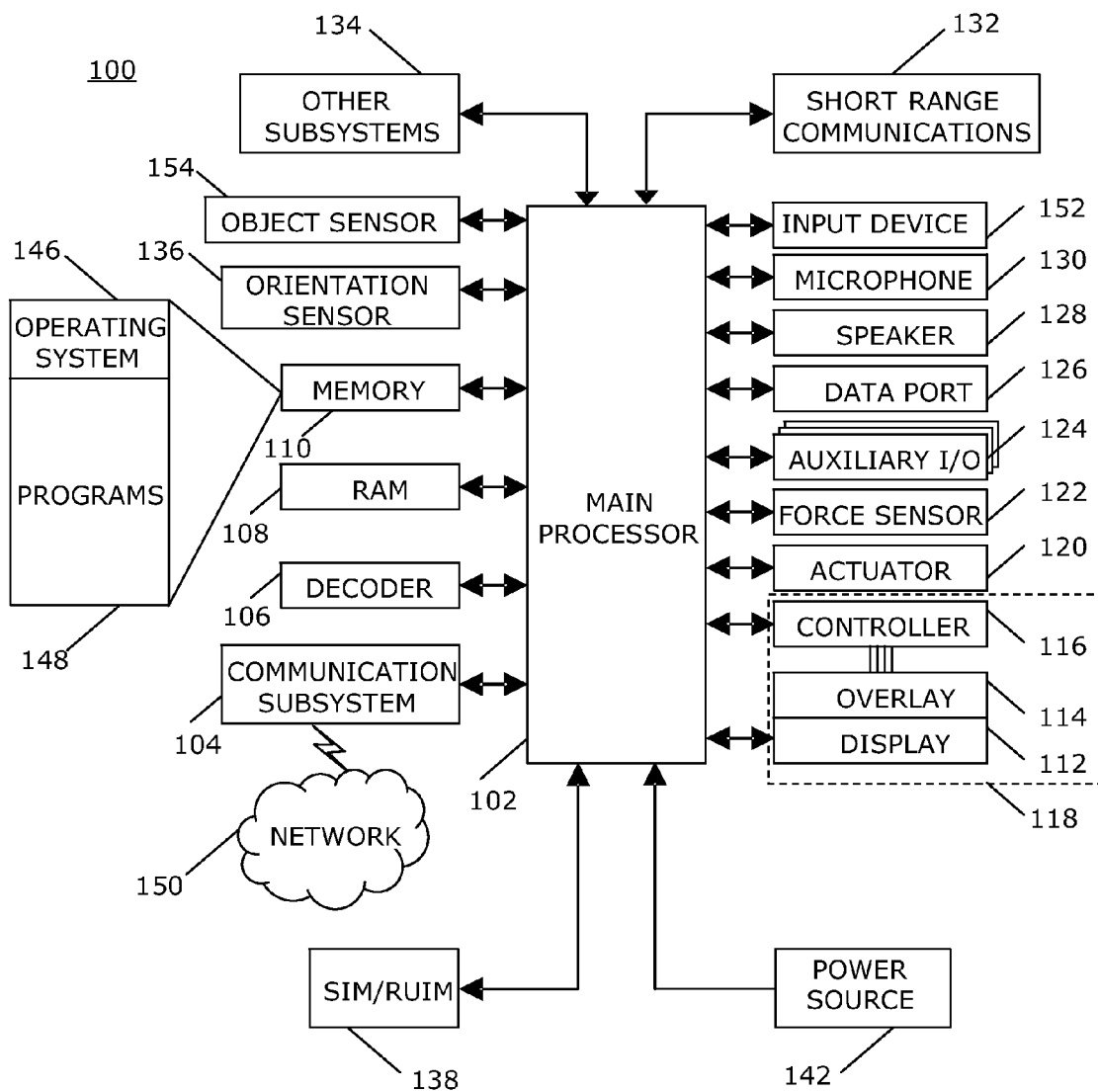
FIG. 1 is a simplified block diagram of one example of a portable electronic device in accordance with the present disclosure.

The following describes a device and method of controlling a portable electronic device by scrolling information associated with a touch location when a tilt of the portable electronic device is detected.

In one aspect, there is provided a method including: displaying a portion of information on a touch-sensitive display; detecting a touch on the touch-sensitive display at a touch location associated with the information; detecting a tilt of the portable electronic device; and in response to detecting the tilt, scrolling the information.

In another aspect, there is provided a portable electronic device including: a touch-sensitive display configured to display a portion of information; an accelerometer in communication with the processor for detecting a tilt of the portable electronic device; and a processor connected to the touch-sensitive display to detect a touch on the touch-sensitive display and when a tilt of the portable electronic device is detected, scroll the information.

In still another aspect, there is provided a method of controlling a portable electronic device including: displaying a portion of information on a touch-sensitive display, the information comprising selectable regions; detecting a touch on the touch-sensitive display at a touch location associated with the information; detecting a tilt of the portable electronic device; and in response to detecting the tilt, moving the highlight from a selected selectable region to a next selectable region in a first direction; and when a selectable region at a boundary is highlighted, scrolling the information in a second direction.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, tablet computers, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators 120 to provide tactile feedback and one or more force sensors 122 to detect a force imparted on the touch-sensitive display 118. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor 136 such as an accelerometer that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The duration of the swipe may be determined from the origin point and finishing point of the swipe in time. The processor 102 receives data from the controller 116 to determine the direction, magnitude, and duration of the swipe. The gesture may be tracked and a plurality of sub-vectors determined for each gesture. The final sub-vector may be utilized to determine a distance and duration of a final portion of the gesture. The processor 102 receives data from the controller 116 to determine the speed of the swipe based on the distance and duration of the final portion of the gesture.

Actuators 120 may be disposed beneath the touch-sensitive display 118 and may be depressed or activated by applying sufficient force to the touch-sensitive display 118 to overcome the actuation force of the actuator 120. The actuators 120 may provide input to the processor 102 when actuated. Actuation of the actuator(s) 120 may result in provision of tactile feedback. Force sensors 122 may work in combination with the actuators to measure an applied force. Force generally refers to force measurements, estimates, and/or calculations, such as pressure, deformation, stress, strain, force density, force-area relationships, thrust, torque, and other effects that include force or related quantities.

Figure 2:
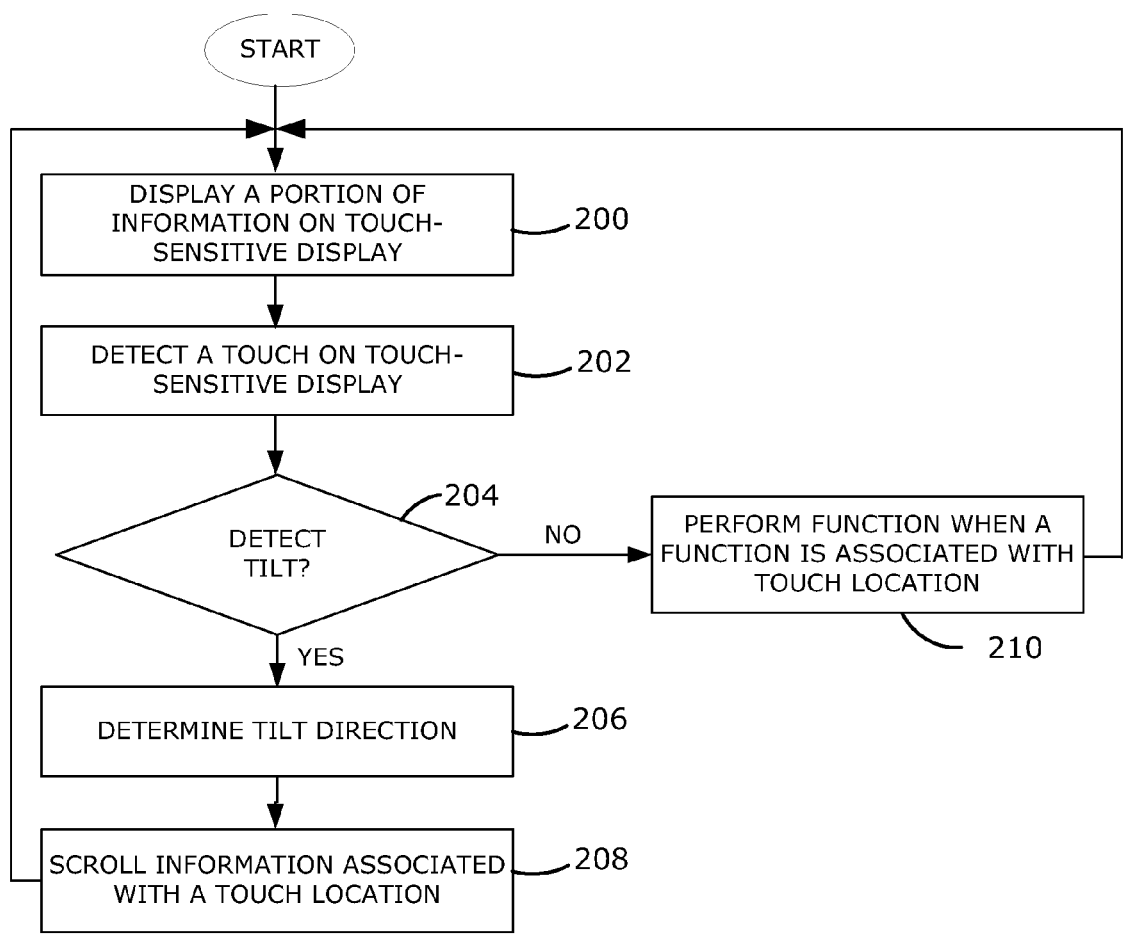
FIG. 2 is a flowchart illustrating an example of a method of controlling an electronic device in accordance with the present disclosure.

FIG. 2 is a flowchart illustrating an example of a method of controlling a portable electronic device 100. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

According to the method of FIG. 2, when a portion of information is displayed 200 on a touch-sensitive display 118, a touch associated with the information is detected 202, a tilt of the portable electronic device 100 is detected 204 and a tilt direction is determined 206. When no tilt is detected, a function that is associated with a touch location is performed 210. In response to detection 204 of the tilt, the information is scrolled 208. The information may be scrolled in a scrolling direction that corresponds to the tilt direction. The scrolling direction may be up, down, left, right or any direction that causes new information to be displayed on the touch-sensitive display and removes previously displayed information.

In one example, a timer may start in response to a down touch, which may correspond to a user's finger contacting the touch-sensitive display 118, and a function corresponding to a touch location may be performed in response to an up touch, which may correspond to a user's finger breaking contact with the touch-sensitive display 118. When the time between down touch and up touch exceeds a threshold time, or when a tilt is detected, a function may not be performed in response to the up touch.

A tilt may be detected 204 when a tilt angle exceeds a threshold. The tilt angle may be indicated relative to a global coordinate system or may be indicated relative to a position of the portable electronic device 100 when the touch is detected 202. For example, when the portable electronic device 100 is held in a position that is approximately 30 degrees from vertical, a tilt angle of at least 15 degrees toward vertical or further away from vertical may cause a tilt to be detected 204 following detection 202 of a touch. The tilt may be detected using the orientation sensor 136 of the portable electronic device 100, for example. In addition, duration and angle of tilt may be used to determine the amount of information that is scrolled.

Figure 3A:
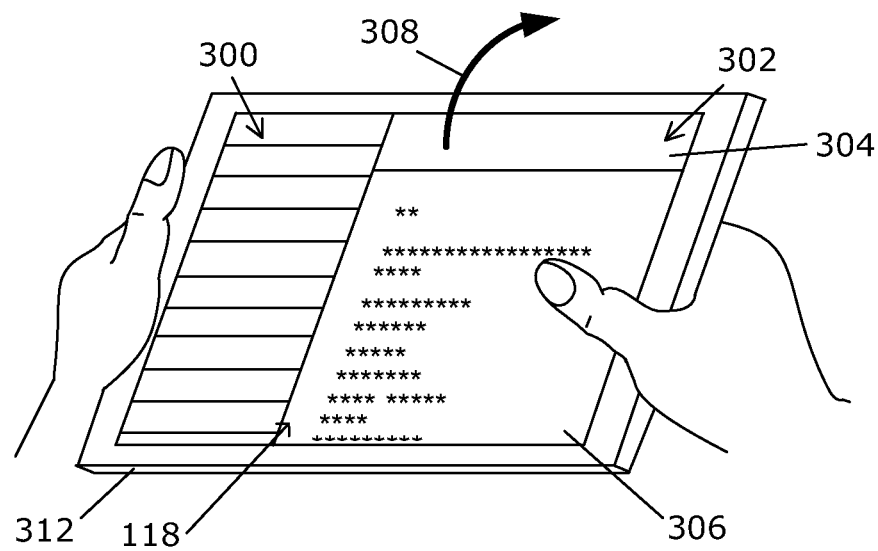
FIG. 3A illustrates an example of a portable electronic device receiving a touch and a tilt in accordance with the present disclosure.
Figure 3B:
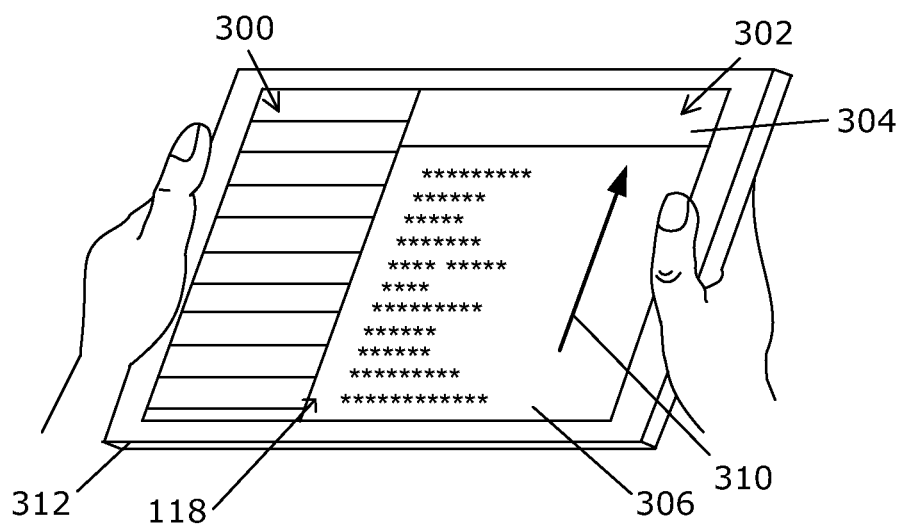
FIG. 3B illustrates an example of a portable electronic device in accordance with the present disclosure.
Figure 4:
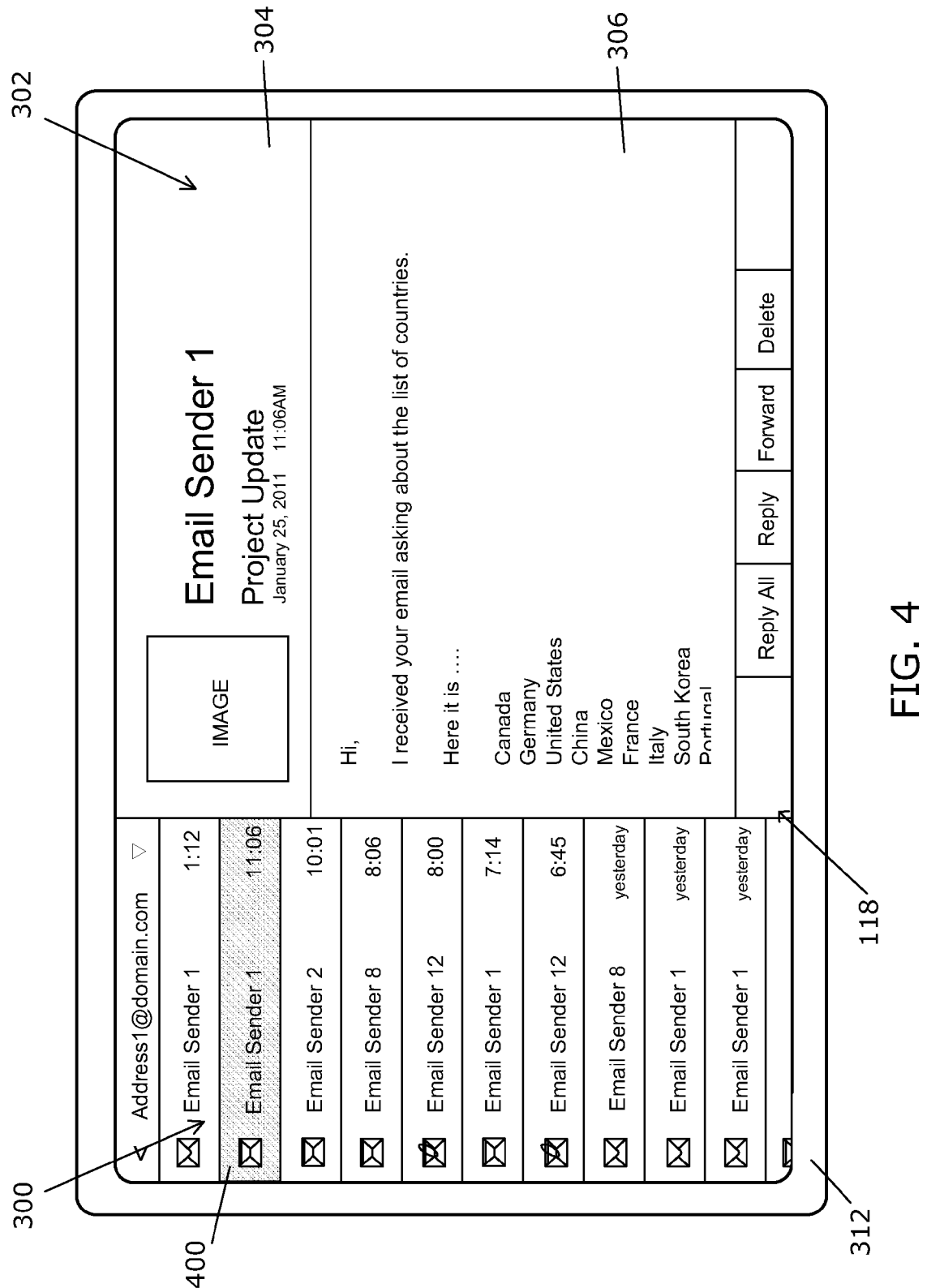
FIGS. 4 to 6 are example portable electronic device front views displaying scrollable information.

Continued reference is made to FIG. 2 with additional reference to FIGS. 3a and 3B to describe one example of a method of controlling a portable electronic device 100. The example portable electronic device 100 includes a housing 312 that houses the internal components that are shown in FIG. 1 and frames the touch-sensitive display 118 such that an outer surface of the touch-sensitive display 118 is exposed for user-interaction when the portable electronic device 100 is in use. In the present example, a message list 300 and a message 302 of a messaging application are displayed side-by-side on the touch-sensitive display 118, as shown in FIG. 4. The message 302 displays information in a header 304 and a message body 306 that is associated with a selected message 400 of the message list 302. The selected message 400 is indicated by highlighting, as shown in FIG. 4. Both the message list 300 and the message 302 display a portion of information. In this example, the information in the message list 300 and at least the message body 306 of the message 302 is scrollable to display additional information.

In FIG. 3A, the portable electronic device 100 is gripped by a user's hands and the user's right thumb performs a touch. The touch is associated with the message body 306 and is detected 200 by the processor 102 of the portable electronic device 100. A tilt of the portable electronic device 100 is then detected 204 by the processor 102 and a tilt direction determined 206. In the present example, the tilt direction is generally away from the user, as indicated by arrow 308 of FIG. 3A. In response to detection of the tilt of the portable electronic device 100, information of the message body 306 scrolls upward, as indicated by arrow 310 of FIG. 3B.

The touch is associated with the message body 306 when the touch is detected within an area (not shown) on the touch-sensitive display 118 where the message body 306 is displayed. In the example of FIG. 3A, the area corresponds to the rectangle bounded by the housing 312 where the housing 312 meets the touch-sensitive display 118, the message list 300 and the header 304. Other areas are present on the touch-sensitive display 118 including an area associated with the message list 300 and an area associated with the header 304. The area and the displayed information to be scrolled may not correspond exactly. For example, when the information to be scrolled is displayed adjacent to information that is not scrollable, a touch may be associated with the information to be scrolled when the touch is located within an area that is larger than the displayed area of the information to be scrolled. In this example, the area may overlap with a portion of the information that is not scrollable.

The direction of tilt may be away from the user, as shown in FIG. 3A, toward the user or to the left or right. Each tilt direction is associated with a direction of scroll. In the present example, a tilt toward the user corresponds to an upward scroll, a tilt away from the user corresponds to a downward scroll, a tilt to the left corresponds to a scroll to the left and a tilt to the right corresponds to a scroll to the right. The tilt directions may alternatively correspond with different scrolling directions.

Figure 5:
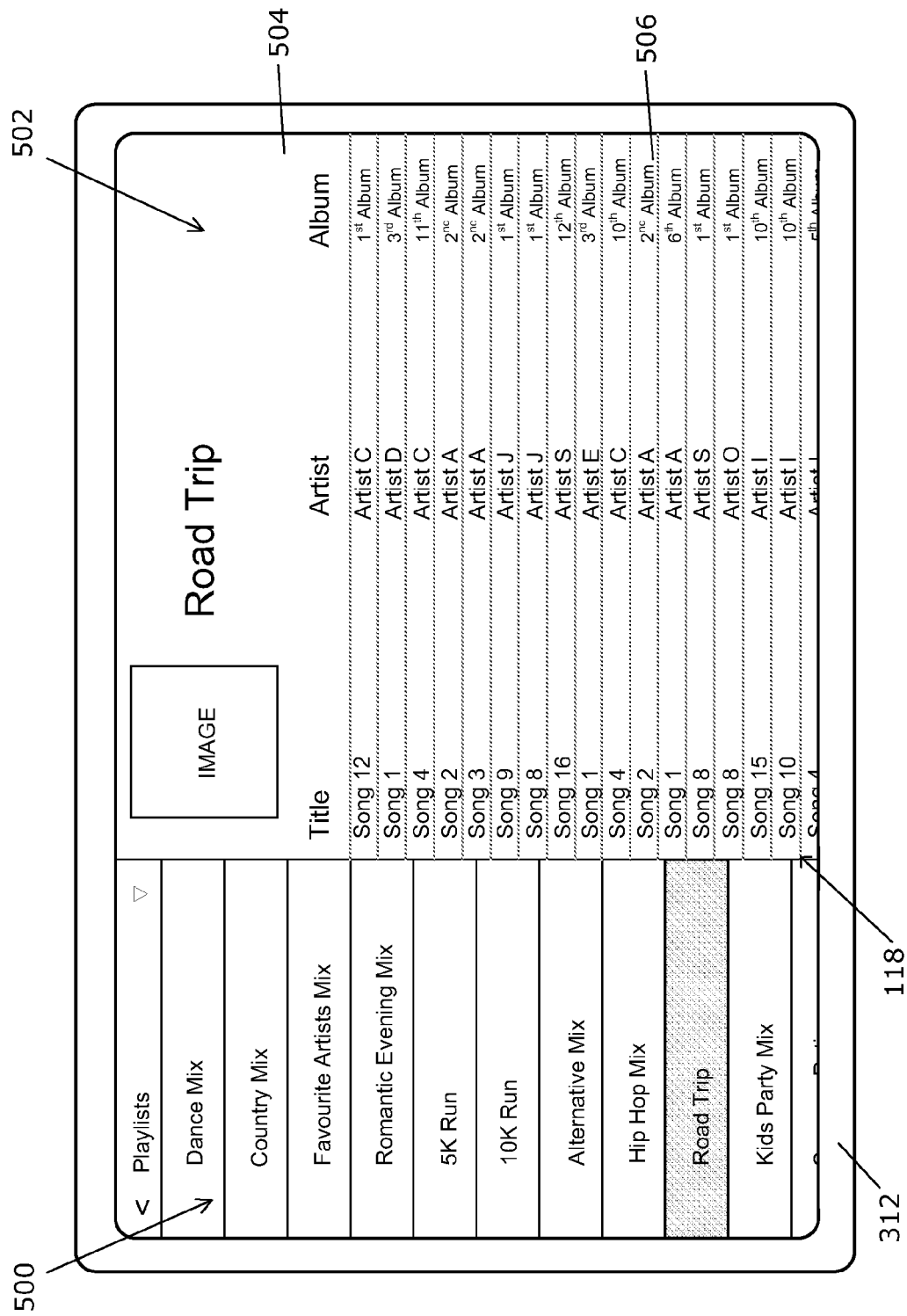

Referring to FIG. 5, a playlist selection list 500 and a song list 502 of a music player application are displayed side-by-side on the touch-sensitive display 118. The song list 502 includes a header 504 and listing 506. In this example, scrolling of the playlist selection list 500 and at least the listing 506 may be achieved using the method of FIG. 2.

Figure 6:
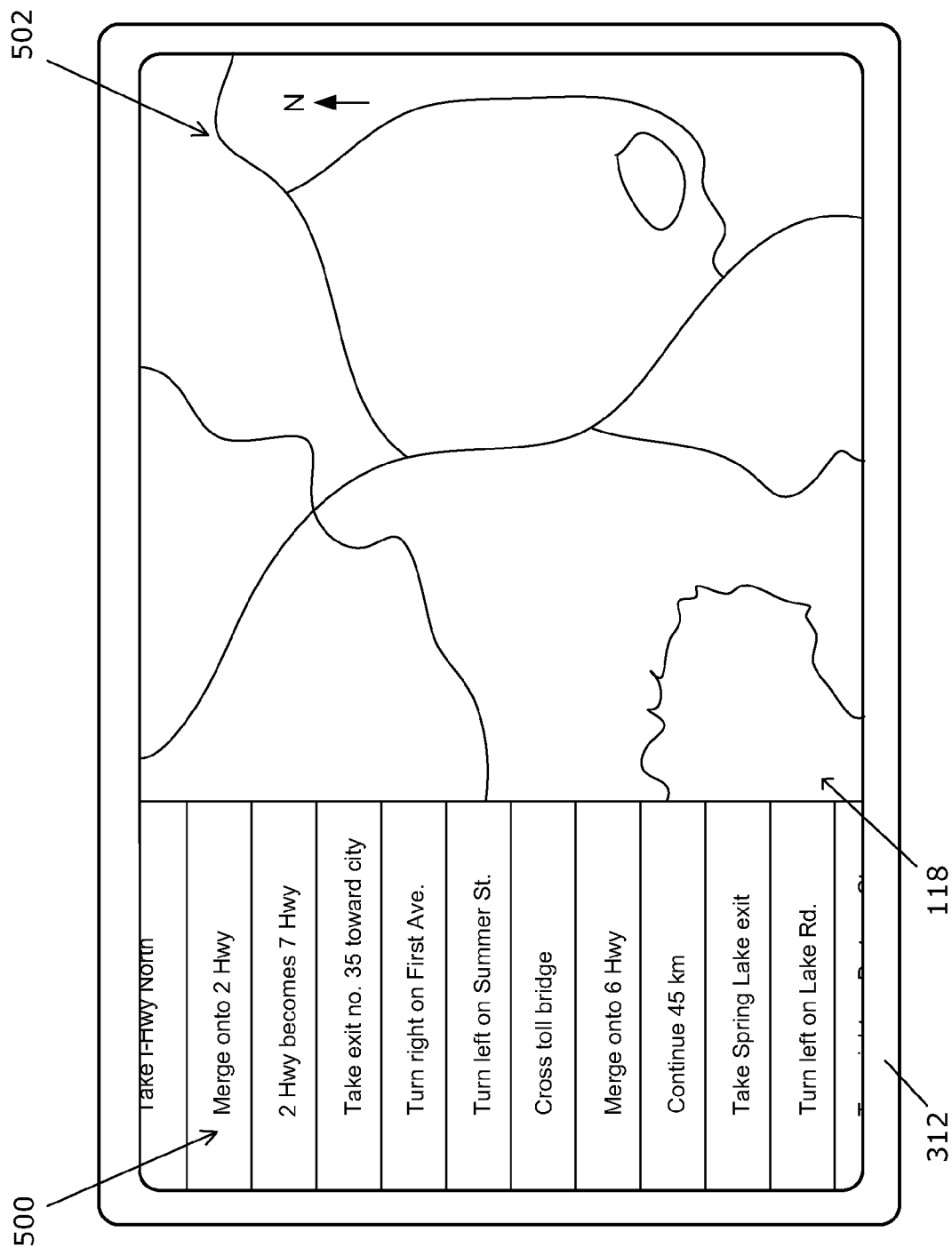

Referring to FIG. 6, driving directions 600 and a map 602 are displayed side-by-side on the touch-sensitive display 118. Scrolling of the driving directions 600 and the map 602 may be achieved using the method of FIG. 2. The portable electronic device 100 may be held in one hand and scrolling of the map 602 in any direction may be achieved while the user's other hand is engaged pumping gas or handling luggage, for example.

Figure 7:
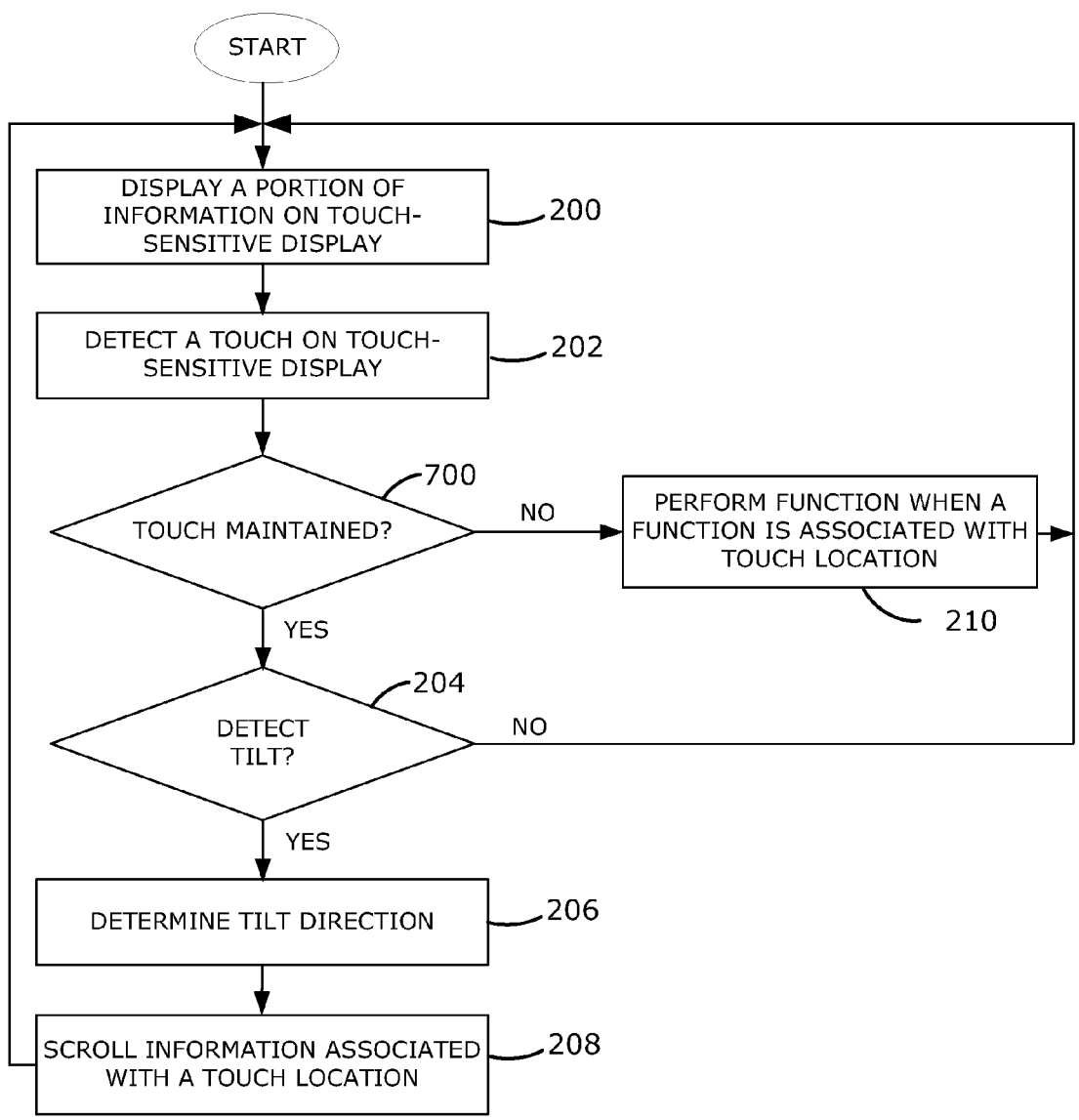
FIG. 7 is a flowchart illustrating another example of a method of controlling an electronic device in accordance with the present disclosure.

In the example method of FIG. 2, the processor 102 performs a function that is associated with a touch location after the processor 102 has determined that there has been no tilt of the portable electronic device 100. Referring to FIG. 7, another example method is shown in which, following detection 202 of a touch, the processor 102 determines if the touch is maintained 700. In this example method, when the touch is not maintained, such as when the user makes a selection by tapping the touch-sensitive display 118, the processor 102 performs a function that is associated with a touch location. When the touch is maintained, the method proceeds as has been described with respect to the method of FIG. 2.

The length of time that the touch may be maintained before a tilt is detected 204 may be set to a threshold time. When the touch is not maintained beyond the threshold time, a function associated with the touch location may be performed 210. The threshold time may be a user-adjustable setting.

In another example method, the tilt may be detected 204 and the tilt direction determined 206 prior to the threshold time being exceeded, however, scrolling of information may not occur until the threshold time has been exceeded.

Figure 8:
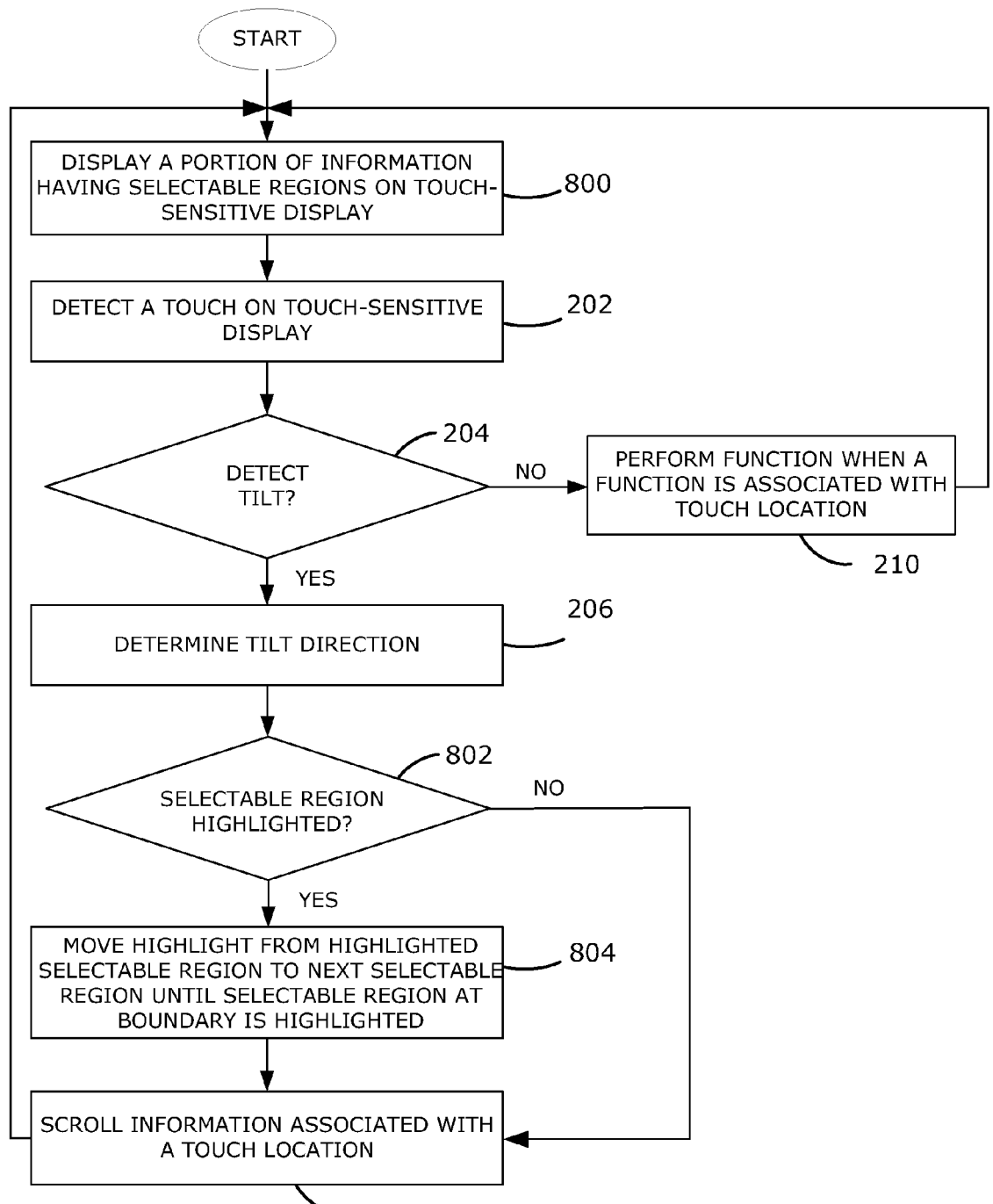
FIG. 8 is a flowchart illustrating another example of a method of controlling an electronic device in accordance with the present disclosure.

Referring to FIG. 8, another example method of controlling a portable electronic device 100 is shown. This method is performed when the scrollable information includes selectable regions that may be highlighted, or otherwise visually differentiated from other selectable regions displayed, such as a selected message 400 of the message list 302 of FIG. 4, for example. In this example method, when a portion of information including selectable regions is displayed 800 on a touch-sensitive display 118, a touch associated with the information is detected 202, a tilt of the portable electronic device 100 is detected 204 and a tilt direction is determined 206. When the information includes a selectable region that is highlighted 802, a next selectable region is highlighted and a previously selected selectable region is un-highlighted in response to detection of the tilt. The highlight moves from a highlighted selectable region to a next selectable region in a first direction until a selectable region at a boundary of the portion of information displayed is highlighted 804. Then, the information associated with the touch location is scrolled 208 in a second direction. Similar to the method of FIG. 2, when no tilt is detected, a function that is associated with a touch location is performed 210.

The first direction and the second direction may be opposite to one another. For example, when the portable electronic device 100 is tilted away from the user, the highlight in a list may move down to the list member at the bottom of the list portion displayed then the list may scroll up to add list members at the bottom of the list portion displayed and remove list members at the top of the list portion displayed.

The boundary may be at the top, bottom, left of right of the portion of information, for example. When the information including selectable regions is a list having list members, boundaries may be at the top and bottom of the list, for example.

Although the portable electronic device 100 shown in FIGS. 3A and 3B is held by two hands of a user. An advantage of the methods disclosed herein is that the portable electronic device 100 may be gripped with a single hand while scrolling.

The methods described herein provide an alternative to scrolling in response to a swipe, which provides increased functionality because swipes may be associated with other functions. Further, the methods described herein avoid unintentional scrolling by detecting a touch and tilt combination rather than scrolling when only a tilt is detected.

When multiple portions of information are displayed at different locations on the touch-sensitive display 118 at the same time, the touch location indicates to the processor 102 which information to scroll. Because the touch-sensitive display 118 must be touched at the location where the information to be scrolled is displayed prior to the scrolling operation being performed, the user's touch must be intentional, which may facilitate efficient and effective user control over the portable electronic device 100.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of controlling a portable electronic device comprising:
displaying a portion of first scrollable information within a first area on a touch-sensitive display;
displaying a portion of second scrollable information within a second area, outside of the first area on the touch-sensitive display;
detecting a touch on the touch-sensitive display at one of a first touch location within the first area where the portion of the first scrollable information is displayed and a second location within the second area where the second scrollable information is displayed;
in response to detecting a tilt of the portable electronic device within a period of time of detecting the touch on the touch-sensitive display, which period of time is less than a threshold period of time, wherein a tilt angle exceeds a threshold angle, the tilt angle being determined based on a rotation angle of a housing of the portable electronic device from a touched position of the housing of the portable electronic device, the housing being in the touched position when the touch is detected, the tilt being detected by an orientation sensor that is located within the housing of the portable electronic device, scrolling based on the touch by:
in response to detecting the touch in the first area and detecting the tilt, scrolling the first scrollable information in the first area by discontinuing displaying at least part of the portion of the first scrollable information and beginning displaying a further portion of the first scrollable information, and not scrolling the second scrollable information such that the second scrollable information remains unchanged, wherein the amount of first scrollable information that is scrolled is dependent on the duration of the tilt and the tilt angle;
in response to detecting the touch in the second area and detecting the tilt, scrolling the second scrollable information in the second area by discontinuing displaying at least part of the portion of the second scrollable information and beginning displaying a further portion of the second scrollable information, and not scrolling the first scrollable information such that the first scrollable information remains unchanged, wherein the amount of second scrollable information that is scrolled is dependent on the duration of the tilt and the tilt angle;
in response to detecting the touch and the period of time meeting the threshold period of time without detecting the tilt, performing a function when the function is associated with the touch.

2. A method as claimed in claim 1, wherein the first scrollable information is scrolled in a scrolling direction that corresponds to the tilt direction.

3. A method as claimed in claim 1, wherein the first scrollable information is one of: a list, an electronic message content or a map.

4. A method as claimed in claim 1, wherein the scrolling direction is one of: up, down, left and right.

5. A method as claimed in claim 1, wherein when the first scrollable information is a list and a list member is highlighted, the highlight is moved in a first direction and the first scrollable information is scrolled in a second direction when the first scrollable information is scrolled.

6. A method as claimed in claim 5, wherein the first direction is opposite to the second direction.

7. A method as claimed in claim 1, wherein when the tilt direction is away from a user, the scrolling direction is from a bottom of the touch-sensitive display to a top of the touch-sensitive display.

8. A method as claimed in claim 1, wherein the first scrollable information is one of: a list, electronic message content or a map and the second scrollable information is one of: a list, electronic message content or a map.

9. A method as claimed in claim 1, wherein in response to detection of the tilt and the touch in the first area, moving a highlight from a selected selectable region of the first scrollable information to a next selectable region of the first scrollable information in a first direction; and when a selectable region at a boundary is highlighted, scrolling the first scrollable information in a second direction.

10. A method as claimed in claim 9, wherein the first scrollable information is a list and the selectable regions are list members.

11. A method as claimed in claim 9, wherein the first direction and the second direction are opposite to one another.

12. A method as claimed in claim 1, wherein an amount of the first scrollable information scrolled is determined based on one of: the tilt angle and a duration of the tilt.

13. A non-transitory computer-readable medium comprising instructions executable on a processor of the portable electronic device for implementing the method of claim 1.

14. A portable electronic device comprising:
- a touch-sensitive display configured to display a portion of first scrollable information within a first area and a portion of second scrollable information in a second area, outside of the first area, the touch-sensitive display being framed by a housing;
- a processor connected to the touch-sensitive display to detect a touch on the touch-sensitive display at one of a first location within the first area where the portion of the first scrollable information is displayed and a second location within the second area where the portion of the second scrollable information is displayed; and
- an orientation sensor in communication with the processor for detecting a tilt of the portable electronic device when a tilt angle exceeds a threshold angle, the tilt angle being determined based on a rotation angle of a housing of the portable electronic device from a touched position of the housing of the portable electronic device, the housing being in the touched position when the touch is detected; and
- wherein in response to detecting, by the orientation sensor, the tilt of the portable electronic device within a period of time of detecting the touch on the touch-sensitive display, which period of time is less than a threshold period of time, the first scrollable information is scrolled in the first area by discontinuing displaying at least a portion of the first scrollable information and beginning displaying a further portion of the first scrollable information, and the second scrollable information is not scrolled, such that the second scrollable information remains unchanged, wherein the amount of first scrollable information that is scrolled is dependent on the duration of the tilt and the tilt angle;
- wherein in response to detecting, by the orientation sensor, the tilt of the portable electronic device within the period of time of detecting the touch on the touch-sensitive display, which period of time is less than the threshold period of time, the second scrollable information is scrolled in the second area by discontinuing displaying at least a portion of the second scrollable information and beginning displaying a further portion of the second scrollable information, and the first scrollable information is not scrolled, such that the first scrollable information remains unchanged, wherein the amount of second scrollable information that is scrolled is dependent on the duration of the tilt and the tilt angle;
- wherein, in response to detecting the touch and the period of time meeting the threshold period of time without detecting the tilt, performing a function when the function is associated with the touch.

15. A portable electronic device as claimed in claim 14, wherein the first scrollable information is one of: a list, electronic message content or a map.

* * * * *